(12) United States Patent
Fukuhara

(10) Patent No.: US 7,946,077 B2
(45) Date of Patent: May 24, 2011

(54) CONTAINER FOR CAPTURING MOSQUITO LARVAE

(76) Inventor: Daiji Fukuhara, Joetsu (JP)

( * ) Notice: Subject to any disclaimer, the term of this patent is extended or adjusted under 35 U.S.C. 154(b) by 85 days.

(21) Appl. No.: 12/442,484

(22) PCT Filed: Aug. 28, 2007

(86) PCT No.: PCT/JP2007/066626
§ 371 (c)(1),
(2), (4) Date: Mar. 23, 2009

(87) PCT Pub. No.: WO2008/035545
PCT Pub. Date: Mar. 27, 2008

(65) Prior Publication Data
US 2010/0083562 A1    Apr. 8, 2010

(30) Foreign Application Priority Data

Sep. 21, 2006   (JP) ................................ 2006-285514

(51) Int. Cl.
*A01M 1/10* (2006.01)
*A01M 1/02* (2006.01)
(52) U.S. Cl. ............................ 43/107; 43/122; 43/132.1
(58) Field of Classification Search ............... 43/107, 43/132.1, 121, 122; 141/331, 333, 334, 340, 141/341; 220/229
See application file for complete search history.

(56) References Cited

U.S. PATENT DOCUMENTS

| | | | | |
|---|---|---|---|---|
| 239,967 A | * | 4/1881 | McAuslan | 141/331 |
| 374,875 A | * | 12/1887 | Lyman | 141/340 |
| 454,240 A | * | 6/1891 | Whelan | 141/331 |
| 947,917 A | * | 2/1910 | Kollenberg | 141/331 |
| 1,867,252 A | * | 7/1932 | Crigler | 43/121 |
| 1,882,380 A | * | 10/1932 | Braun | 43/107 |
| 1,936,644 A | * | 11/1933 | Schroder | 43/121 |
| 2,234,500 A | * | 3/1941 | Moore | 43/121 |
| 2,255,360 A | * | 9/1941 | Miller | 43/121 |
| 2,565,142 A | * | 8/1951 | Mattingly | 43/121 |
| 2,770,066 A | * | 11/1956 | O'Sullivan | 43/107 |
| 2,810,776 A | * | 10/1957 | Solomon et al. | 141/331 |
| 3,256,916 A | * | 6/1966 | Silletti | 141/333 |
| 3,997,999 A | * | 12/1976 | Evans | 43/107 |

(Continued)

FOREIGN PATENT DOCUMENTS

DE    3316045 A1 * 11/1984

(Continued)

*Primary Examiner* — Darren W Ark
(74) *Attorney, Agent, or Firm* — Christopher & Weisberg, P.A.

(57) ABSTRACT

The present invention is a container for capturing mosquito larvae comprising: a water container (8) in which natural water can be pooled; an open-top concave induction pipe (1) which is to be intruded into the water container (8); a passage opening (4) formed in the lower part of the concave induction pipe (1); a passage-blocking member (5) for blocking the passage opening (4) in the case where the water levels in the water container (8) and in the concave induction pipe (1) are not higher at least than the top end of the passage opening (4); and a closed space (11) formed in the upper part between the water container (8) and the concave induction pipe (1), characterized in that the above members are so constructed that, after spawning in the concave induction pipe (1), hatched mosquito larvae migrate via the passage opening (4) to the space between the water container (8) and the concave induction pipe (1) and, after emerging, the imagoes die in the closed space (11) and accumulated therein.

4 Claims, 3 Drawing Sheets

U.S. PATENT DOCUMENTS

| | | | |
|---|---|---|---|
| 4,002,146 A * | 1/1977 | Neff | 119/51.04 |
| 4,019,459 A * | 4/1977 | Neff | 119/51.04 |
| 4,328,636 A * | 5/1982 | Johnson | 43/107 |
| 4,335,730 A | 6/1982 | Griffin | 141/331 |
| 4,608,774 A * | 9/1986 | Sherman | 43/121 |
| 4,631,857 A * | 12/1986 | Kase et al. | 43/132.1 |
| 4,706,410 A * | 11/1987 | Briese | 43/107 |
| 4,899,485 A * | 2/1990 | Schneidmiller | 43/107 |
| 4,997,013 A * | 3/1991 | Peckels | 141/340 |
| 5,101,869 A * | 4/1992 | Myers | 141/331 |
| 5,123,201 A * | 6/1992 | Reiter | 43/107 |
| 5,309,668 A * | 5/1994 | Barton | 43/122 |
| 5,501,033 A * | 3/1996 | Wefler | 43/132.1 |
| 5,609,189 A * | 3/1997 | Sternheimer et al. | 141/329 |
| 5,896,697 A * | 4/1999 | Kang | 43/107 |
| 5,937,919 A * | 8/1999 | Zavos et al. | 141/333 |
| 5,983,557 A * | 11/1999 | Perich et al. | 43/107 |
| 6,023,884 A * | 2/2000 | Yanohara | 43/132.1 |
| 6,112,452 A * | 9/2000 | Campbell | 43/107 |
| 6,112,453 A * | 9/2000 | Clarke, Jr. | 43/113 |
| 6,158,165 A * | 12/2000 | Wilson | 43/107 |
| 6,179,022 B1 * | 1/2001 | Schneider et al. | 141/331 |
| 6,185,861 B1 * | 2/2001 | Perich et al. | 43/107 |
| 6,189,259 B1 * | 2/2001 | Soller | 43/132.1 |
| 6,223,465 B1 * | 5/2001 | Soller et al. | 43/132.1 |
| 6,301,827 B1 * | 10/2001 | Lankster | 43/107 |
| 6,335,027 B1 * | 1/2002 | Levy | 43/42.06 |
| 6,337,078 B1 * | 1/2002 | Levy | 43/131 |
| 6,338,220 B1 * | 1/2002 | Dicks | 43/132.1 |
| 6,346,262 B1 * | 2/2002 | Levy | 43/131 |
| 6,389,740 B2 * | 5/2002 | Perich et al. | 43/132.1 |
| 6,564,503 B1 * | 5/2003 | Miyahara et al. | 43/112 |
| 6,594,944 B2 * | 7/2003 | Chura | 43/98 |
| 6,618,984 B1 * | 9/2003 | Li | 43/107 |
| 6,651,378 B2 * | 11/2003 | Baker | 43/121 |
| 6,665,979 B1 * | 12/2003 | Hsu | 43/107 |
| 6,708,443 B2 * | 3/2004 | Hall | 43/107 |
| 6,886,293 B2 * | 5/2005 | Forehand | 43/107 |
| 6,925,749 B2 * | 8/2005 | Wong | 43/107 |
| 6,990,768 B1 * | 1/2006 | Boston | 43/107 |
| 7,024,815 B1 * | 4/2006 | Visagie | 43/107 |
| 7,073,287 B2 * | 7/2006 | Lau | 43/107 |
| 7,134,238 B2 * | 11/2006 | Forehand | 43/107 |
| 7,178,685 B2 * | 2/2007 | Hidalgo et al. | 220/229 |
| 7,222,453 B2 * | 5/2007 | Uhl | 43/122 |
| 7,281,350 B2 * | 10/2007 | Wilbanks | 43/107 |
| 7,412,797 B1 * | 8/2008 | Hiscox | 43/107 |
| 7,434,351 B2 * | 10/2008 | Bette | 43/107 |
| 7,448,160 B2 * | 11/2008 | Roberts | 43/107 |
| 7,503,142 B1 * | 3/2009 | Uhl | 43/122 |
| 7,669,362 B2 * | 3/2010 | Cwiklinski et al. | 43/107 |
| 7,694,455 B1 * | 4/2010 | Bowden et al. | 43/107 |
| 7,874,326 B1 * | 1/2011 | Harvey | 141/340 |
| 2005/0210735 A1 * | 9/2005 | Harmer et al. | 43/107 |
| 2005/0274061 A1 * | 12/2005 | Zhu | 43/107 |
| 2005/0279016 A1 * | 12/2005 | Williams et al. | 43/107 |
| 2006/0021275 A1 * | 2/2006 | Howse | 43/107 |
| 2006/0090391 A1 * | 5/2006 | Huang | 43/107 |
| 2006/0248782 A1 * | 11/2006 | Dancy | 43/107 |
| 2007/0044371 A1 * | 3/2007 | Meier et al. | 43/107 |
| 2007/0074447 A1 * | 4/2007 | Kalogroulis | 43/107 |
| 2007/0157508 A1 * | 7/2007 | Chang | 43/107 |
| 2007/0214711 A1 * | 9/2007 | Mignot | 43/107 |
| 2009/0260277 A1 * | 10/2009 | Lebost | 43/107 |
| 2009/0277076 A1 * | 11/2009 | Boston | 43/132.1 |
| 2010/0229458 A1 * | 9/2010 | Bowden et al. | 43/107 |

FOREIGN PATENT DOCUMENTS

| | | | |
|---|---|---|---|
| FR | 2852490 A1 * | 9/2004 | |
| GB | 2410668 A * | 8/2005 | |
| JP | 01273534 A * | 11/1989 | |
| JP | 2147734 A | 6/1990 | |
| JP | 10146145 A * | 6/1998 | |
| JP | 2003061541 A * | 3/2003 | |
| JP | 2003144031 A * | 5/2003 | |
| JP | 2005087199 A * | 4/2005 | |
| JP | 2006223276 A * | 8/2006 | |
| JP | 2007215469 A * | 8/2007 | |
| JP | 2007236359 A * | 9/2007 | |
| JP | 2008307037 A * | 12/2008 | |
| WO | WO 03007710 A1 * | 1/2003 | |
| WO | WO 2007032745 A1 * | 3/2007 | |

* cited by examiner

CONTAINER FOR CAPTURING MOSQUITO LARVAE

CROSS-REFERENCE TO RELATED APPLICATION

This application is a 35 U.S.C. §371 of International Application No. PCT/JP2007/066626, filed Aug. 28, 2007, which application claims priority to Japanese Patent Application Serial No. JP20060285514 filed Sep. 21, 2006, the entirety of all of which are incorporated herein by reference

STATEMENT REGARDING FEDERALLY SPONSORED RESEARCH OR DEVELOPMENT n/a

FIELD OF THE INVENTION

The present invention is for locating a capture container filled with natural water such as rainwater outside to induce parental mosquitoes to spawn, and after a few days, making sediment hatched mosquito larvae fallen along a slope to induce to area in the container where it is difficult to escape, and after emerging, making the imagoes died to destroy.

The present invention relates to a container for capturing mosquito larvae comprising function to block a passage opening automatically by a circular float valve to move up and down in response to increase and decrease of water in order to prevent the imagoes emerged in the container from escaping outside even if water level is decreased by natural evaporation

BACKGROUND OF THE INVENTION

Traditionally, there is a way to locate a container filled with water on a habitat of mosquitoes intentionally to induce parental mosquitoes to spawn, and cleaning them out along with water by human hands at the stage of mosquito larvae which are eggs or larvae.

In addition, the invention to enclose hatched mosquito larvae in a container incorporated a concavo-convex induction pipe (JP Hei 10-146145, A), or the invention to resolve a problem to block a passage opening for falling of the mosquito larvae, by means of invasion of foreign bodies or proliferation of aquatic organism which are difficult to prevent at the outside installation and the like (JP 2006-223276) are known.

Thus, the efficient and effective way is to destroy when the mosquito is at the stage of an egg or a larva. However, the way actually is not carried out so often generally. The reasons are as follows.

(A) It is difficult to catch timing to throw the water away, since the eggs of mosquitoes are very small and it is very difficult to judge with eyes if the parental mosquito has spawned at the edge in the container or not.

(B) It labor some for a person to throw the water away or re-supply it regularly, and there is a possibility to provide a proper condition to proliferate in reverse to destroy in the case of forgetting to throw it out.

(C) It is impossible to prevent the foreign bodies from invading or aquatic organism from proliferating, since the container for capturing mosquito larvae is located outside, and there is a possibility to lose capture function by blocking an opening with the foreign bodies during a short term after installing outside, since an opening size is set to be very narrow in the case of structure forming a falling passage for mosquito larvae by fitting a concavo-convex induction pipe in such as the prior art 1.

(D) The occasional dismantling and washing are required in order to prevent obstruction by the foreign bodies to maintain the capture function normally. There is a possibility to forget to incorporate parts, lose, deform, or disable them at the time of assembling them again, since the parts are separated respectively at the time of disassembly in the case of the structure such as the prior art 2.

(E) The probability that the mosquito escapes by floating backward is high and thus the effect for capturing is easy to decrease in the case that a passage opening is located at the bottom of a hollow pipe, namely it is opened downrightly, since the mosquito larvae has the habit of floating approximate vertically from bottom to surface to breathe.

SUMMARY OF THE INVENTION

A container for capturing mosquito larvae of the present invention comprises a water container in which natural water can be pooled; an open-top concave induction pipe which is to be intruded into the water container; a passage opening formed in the lower part of the concave induction pipe; a passage-blocking member for blocking the passage opening in the case where the water levels in the water container and in the concave induction pipe are not higher at least than the top end of the passage opening; and a closed space formed in the upper part between the water container and the concave induction pipe, characterized in that the above members are so constructed that, after spawning in the concave induction pipe, hatched mosquito larvae migrate via the passage opening to the space between the water container and the concave induction pipe and, after emerging, the imagoes die in the closed space and accumulated therein.

The passage opening is formed on the peripheral wall opposed to the lower slope end of a slope induction board formed on an inner wall of a hollow pipe projected at the lower part of the concave induction pipe, and the passage-blocking member is a circular float valve installed to be able to slide up and down and to be unable to drop out in response to water level in the water container at the peripheral part of the hollow pipe.

In addition, the concave induction pipe is a concave floating induction pipe installed to be able to slide up and down and to be unable to drop out in response to water level in the water container, and the passage opening is formed on the peripheral wall opposed to the lower slope end of a slope induction board formed on an inner wall of a hollow pipe projected at the lower part of the floating induction pipe, and the passage-blocking member is a passage-blocking pipe installed vertically on the bottom of the water container to be able to intrude the hollow pipe into.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

We will now describe a container for capturing mosquito larvae carrier according to the present invention with reference to the figures.

Figure 1:
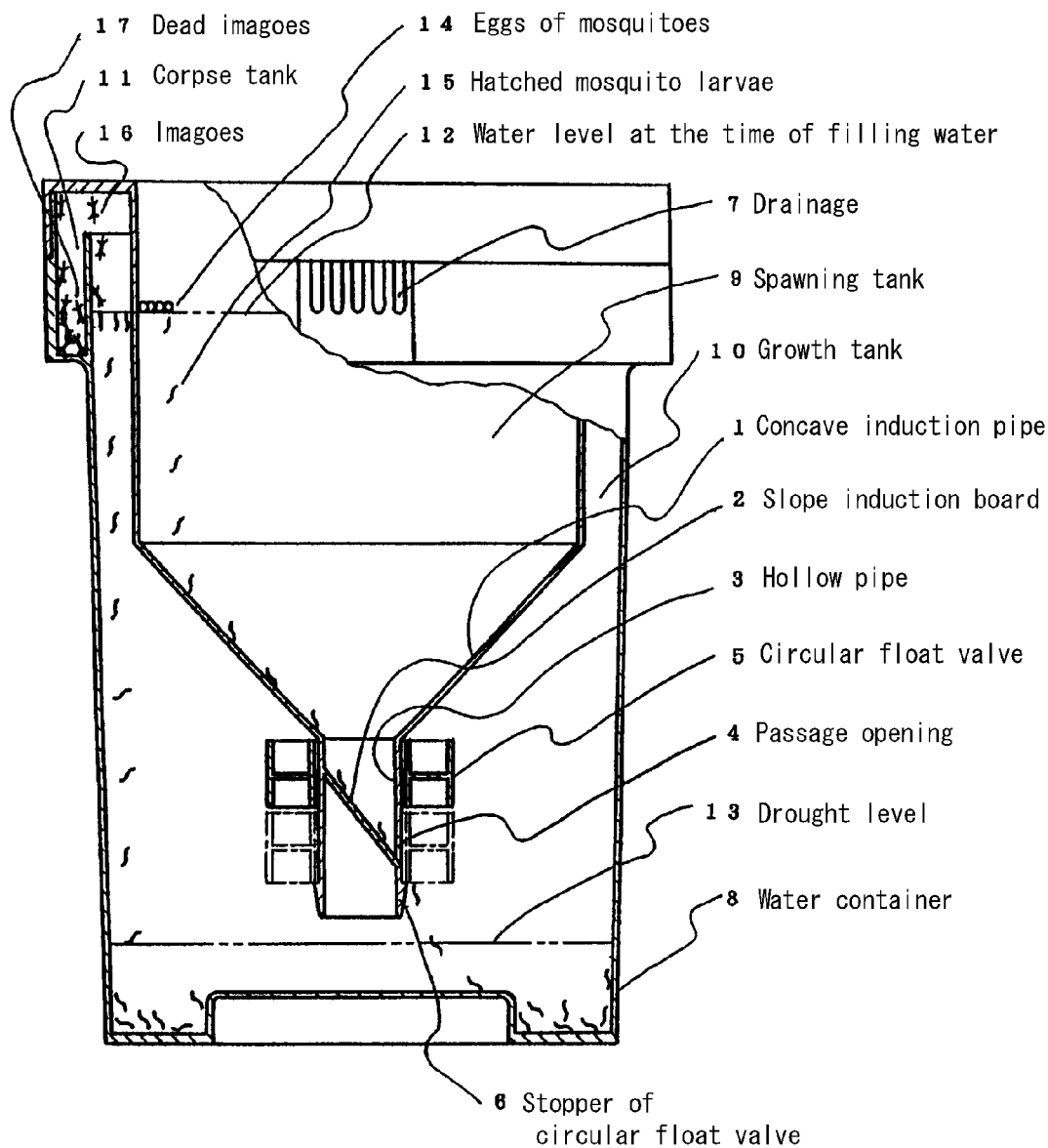
FIG. 1 is a partially fractured cross section of a container for capturing mosquito larvae carrier according to the present invention.

As shown on the FIG. 1, a container for capturing mosquito larvae carrier according to the present invention comprises a water container (8) in which natural water can be pooled; an open-top concave induction pipe (1) which is to be intruded into the water container (8); a passage opening (4) formed in the lower part of the concave induction pipe (1); a circular float valve (5) which is a passage-blocking member for blocking the passage opening (4) in the case where the water levels in the water container (8) and in the concave induction pipe (1) are not higher at least than the top end of the passage opening (4); and a corpse tank (11) which is a closed space formed in the upper part between the water container (8) and the concave induction pipe (1).

The passage opening (4) is formed on the peripheral wall opposed to the lower slope end of a slope induction board (2) formed on an inner wall of a hollow pipe (3) projected at the lower part of the concave induction pipe (1), and the circular float valve (5) is installed to be able to slide up and down and to be unable to drop out in response to water level in the water container (8) at the peripheral part of the hollow pipe (3).

The present invention has the above structure, and it is necessary to fill water in the water container (8) at the time of using the present invention. At this time, the purified tap water should not be used and organic natural water which the parental mosquito is likely to spawn such as water in the river or the pond or the pool is used.

If excess water is supplied in the water container (8), surplus water is drained from drainage (7) and the water level at the time of filling with water is maintained at constant level.

In addition, in order to concentrate spawning of the parental mosquito in the capture container to be installed, the other water in the pool existing at habitat of the mosquito should be thrown and prepare peripheral conditions to prevent rainwater and the like from pooling again.

After preparing the above beforehand, the location where sun and wind do not affect and natural water such as rainwater is supplied in the concave induction pipe (1) properly at the time of raining is selected, and the capture container is located vertically at the stable condition, and spawning of the parental mosquito in a spawning tank (9) is waited.

The eggs (14) of the mosquito after spawning attach to the inner peripheral wall of the upper part of the concave induction pipe (1), or float on surface. After a few days when they hatch and become mosquito larvae (15), they begin to swim and repeat rising and sinking from the bottom to the surface to breathe and prey.

Accordingly, if the water is maintained to the extent not to obstruct spawning in the concave induction pipe (1), the circular float valve (5) rises to the surface along the hollow pipe (3) by buoyant force, and hits and stops at the bottom of the outer peripheral wall of the concave induction pipe (1), and the passage opening (4) is open. Therefore, the mosquito larvae (15) hatched from the eggs (14) of the mosquito is induced to the center opening part along the slope in a cone of the concave induction pipe (1), and after sliding and falling on the slope of the slope induction board (2) installed in the hollow pipe (3), migrates to the side of a growth tank (10) via the passage opening (4).

It is possible to continue to grow in this range, since algae and microorganism which are baits for the mosquito larvae exist in the natural water in this growth tank (10), and airspace exists in space of the upper part on the surface.

The mosquito larvae continue to grow without rising to the surface at the side of the spawning tank (9) and then become the imagoes (16) on the surface in the growth tank (10) in due course, since the passage opening (4) which is a opposite way from this growth tank (10) to the spawning tank (9) is opened at the position deviating from a vertical back-and forth way repeating rising and sinking, namely at the peripheral wall of the hollow pipe (3).

The imagoes (16) migrate at the side of the corpse tank (11) toward the exit, and after a few days they are accumulated as dead imagoes (17), since there is no passage opening to be able to escape to the outside in this space and there is no bait for imagoes.

It is easy to make sure of the destruction effect, since it is possible to observe accumulated condition of the corpse from the outside by means of using transparent or semitransparent resin member and the like as material for the water container (8).

In addition, the water in the water container (8) can decrease by natural evaporation and the water level can be at the drought level, in the case that dry and hot days continue.

At this time, it is impossible for the imagoes (16) to escape to the outside, since the circular float valve (5) falling in connection with decrease of the water level blocks the passage opening (4) automatically.

After that, it is possible to prepare for the following spawning, since the circular float valve (5) rises to the surface by buoyant force along the hollow pipe (3) and the passage opening (4) is automatically opened, if the water is supplied by rainfall or artificially and the water level increase again.

That is, it is possible to automatically ready for fluctuation of the water based on climate condition by means of acting of buoyant force of the circular float valve (5).

Furthermore, as shown on the drawing 2, it is also possible to obtain the capture effect without the circular float valve (5) by intruding a concave floating induction pipe (18) which is made from resin material and the like lighter than the gravity of the water into the water container (8) at the sizes to be able to move up and down freely in connection with increase and decrease of the water.

That is, the concave induction pipe is the concave floating induction pipe (18) installed to be able to slide up and down and to be unable to drop out in response to water level in the water container (8), and the passage opening (4) is formed on the peripheral wall opposed to the lower slope end of a slope induction board (2) formed on an inner wall of a hollow pipe (3) projected at the lower part of the floating induction pipe (18). And the passage-blocking member is the passage-blocking pipe (19) installed vertically on the bottom of the water container (8) to be able to intrude the hollow pipe (3) into.

According to the above structure, it is impossible for the hatched imagoes (16) in the growth tank (10) to escape to the outside, since the floating induction pipe (18) falls and the passage opening (4) opened at the peripheral wall of the hollow pipe (3) is received in the passage-blocking pipe (19) in case that the water in the water container (8) is at the drought level (13). On the other hand, it is possible to be standby for spawning, since the floating induction pipe (18) rises in connection with rising of the water level and also the passage opening (4) gradually rises above the top surface of the passage-blocking pipe (19) to fully open the passage opening (4) which the mosquito larvae fall and pass through, in the case that the water is supplied in the water container (8).

If excess water is supplied in the water container (8), surplus water is drained from drainage (7) installed at the upper part of the outer peripheral wall of the water container (8), because the structure about drain is also the same as one shown on the FIG. 1. Therefore, the water level (12) at the time of filling with water is maintained at constant level.

A floating limit stopper (21) making use of a step of a convex part of the outer peripheral bottom of the corpse tank (11) hits on a floating limit boss (22) formed at the lower end of the outer peripheral wall of the floating induction pipe (18) to regulate floating distance. Hereby, the hollow pipe (3) does not completely drop out of the passage-blocking pipe (19) by floating of the floating induction pipe (18) to excess.

Furthermore, there is no passage opening to evacuate air in an air stock cylindrical wall (20) formed at peripheral conical wall of the floating induction pipe (18). Thus, there is a effect to increase buoyant force of the floating induction pipe (18) since the air remain in inner space in the case that the water level increases.

Figure 2:
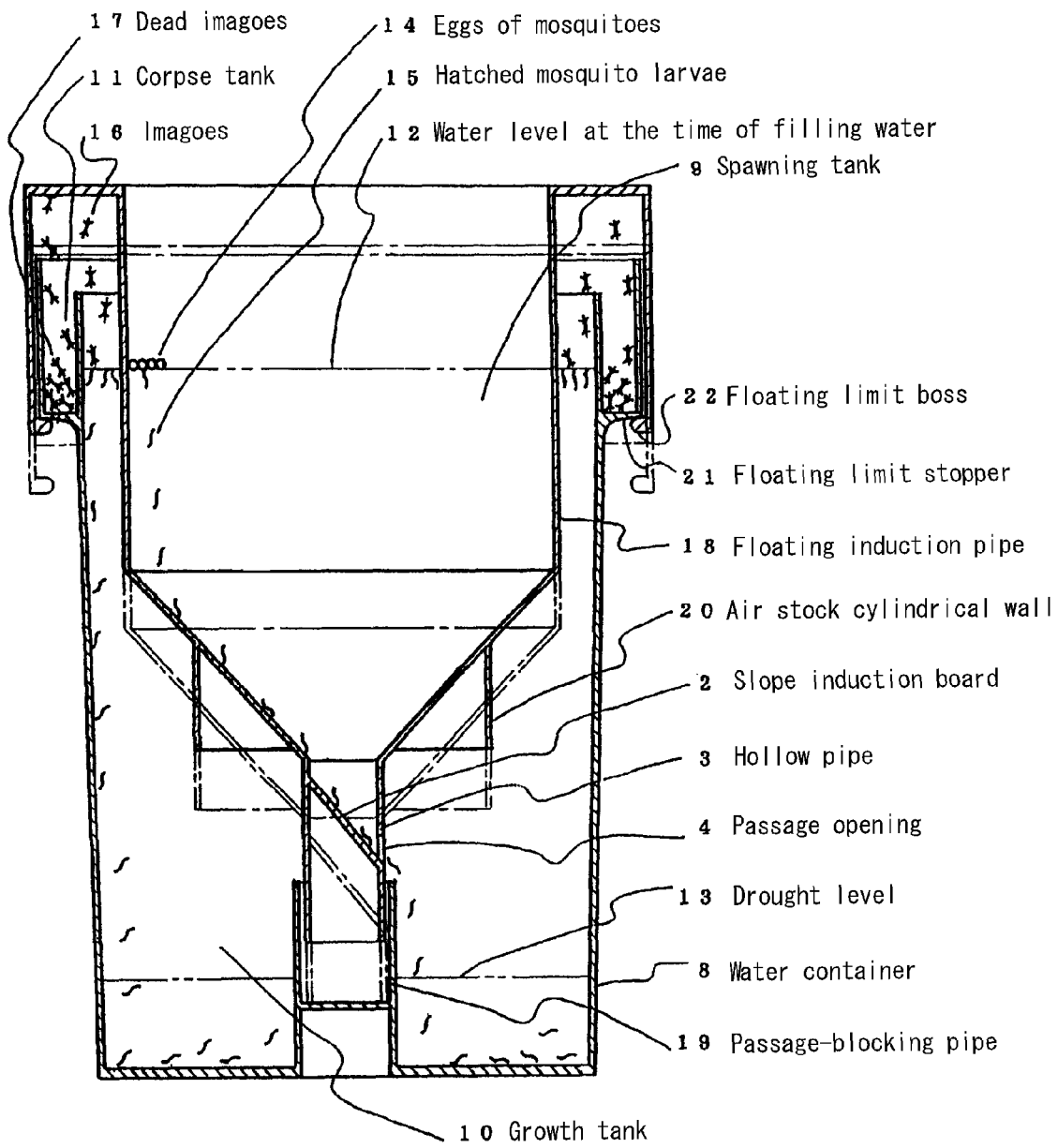
FIG. 2 is a cross section of another example of a container for capturing mosquito larvae carrier according to the present invention.
Figure 3:
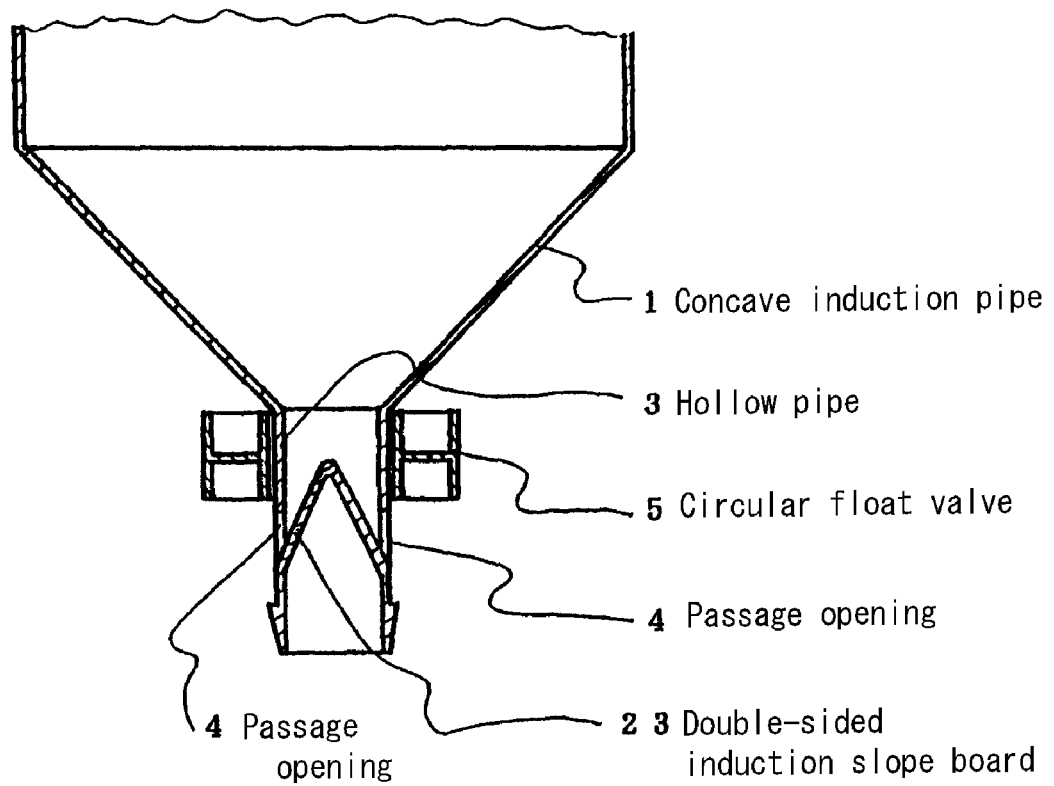
FIG. 3 is a partial cross section of a further example of a container for capturing mosquito larvae carrier according to the present invention.

Though slope induction board (2) formed on an inner wall of the hollow pipe (3) on the FIG. 1 and FIG. 2 is formed in the shape of a one-sided slope, this can be formed in the shape of a triangular double-sided induction slope board (23) and two passage openings (4) can be formed, as shown on the FIG. 3.

According to the above structure, it is possible to decrease probability to lose the capture function, since another one functions as a passage for the mosquito larvae even if one passage opening (4) is blocked by a foreign body.

The following effects can be obtained according to the container for capturing mosquito larvae of the embodiment of the present invention.

(A) It is possible to capture and destroy the mosquito larvae by only setting the capture container on the position where the natural water such as rainwater and the like is properly supplied at the habitat of the mosquito without periodical drain and supply of the water by a human hand.

In addition, it is possible to make sure of the capture effect at sight from the outside of the container, since after emerging, the imagoes die in the container and accumulated therein.

(B) It is possible to destroy them continuously and broadly at a low rate, since it is not necessary to prepare and maintain power supply and limit the area or position to be set. In addition, deformation or breakage of parts rarely occurs by stress caused by freezing of residual water, or the breakdown as a result of those causes rarely occurs, even if it left outside of cold area in winter, since blocking mechanism of the passage opening by the circular float valve is simple.

(C) The problem to block the passage opening by sinking a variety of foreign bodies or breeding of aquatic organism is easy to happen, because the capture container is set at the outside. Thus, there is a big possibility to obstruct the capture function. However, kinds of the sunken minute foreign bodies are not accumulated since they migrate to the side of growth tank via the passage opening in the case of forming the passage opening with space to a certain extent such as the present invention. In addition, the passage opening is not blocked at early stage even if algae and the like breed.

(D) The occasional dismantling and washing are required in order to prevent obstruction by the foreign bodies. It is possible to prevent from forgetting to incorporate parts, losing, deforming, or disabling the parts at the time of assembling them again, since the circular float valve which is a main part is not separated and has structure loosely fitted in the hollow pipe.

(E) There is a possibility for the mosquito larvae to become imagoes by floating backward to the side of the spawning tank again even if they migrates to the side of the growth tank once, and then to escape to the outside, in the case that a passage opening is opened downrightly, since the mosquito larvae has the habit of floating approximate vertically from bottom to surface to breathe. However, it is possible to decrease the possibility for the mosquito larvae to escape to the outside, since the passive opening deviates from floating course of the mosquito larvae because the passive opening is opened at the peripheral wall of the hollow pipe, not at the bottom thereof.

(F) The imagoes cannot escape to the outside in the container, since the circular float valve falling in connection with decreasing of the water level blocks the passive opening automatically in the case that the water decrease by natural evaporation. After that, it is possible to prepare for the following spawning, since the circular float valve rises to the surface by buoyant force and the passage opening for falling of the mosquito larvae is automatically opened, if the water is supplied by rainfall and the water level increase again. That is, it is possible to be ready for fluctuation of the water by means of acting of buoyant force of the circular float valve.

(G) The passage opening for escaping of the mosquito is blocked by the circular float valve and the pooled water in the water container does not contact outside air in the case that the water level decrease by natural evaporation. As a result, evaporation speed is very slow since the only air vent is drainage. Accordingly, it is easy to store water in the spawning tank again and make up condition for the following spawning, since the water is maintained to be pooled in the water container for a certain term, even if the water supplied by rainfall and the like is a bit.

(H) This means does not use a kind of gas or light, heat reservoir which have inducement effect used at an apparatus for capturing imagoes, or a kind of metal such as copper and the like and or drug which are likely to have effect for limiting growth or insecticidal effect to the mosquito larvae, and it is a means for destroying them using the only natural water such as rainwater. Thus, it is possible to prevent consumption of natural or synthetic resource or bad influence to circumstance, and there is no possibility to raise resistant sorts to the drug in the future.

(I) Recently, we have misgivings about expansion to the north area of the habitat of the mosquito carrying tropical infection such as malaria, dengue, West Nile fever and the like by means of influence of global warming at home and abroad. It is possible to prevent expansion of the infection, and to carry out the removal of the mosquito or medical treatment in these walk abroad, and to decrease a variety of losses or maladies and the like beforehand.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A device for capturing mosquito larvae comprising:
   a container;
   a funnel disposed within the container, the funnel having an upper portion and a lower portion, the upper portion being wider than the lower portion;
   an aperture formed on a side of the lower portion of the funnel;
   a sloped board coupled to an interior lower portion of the funnel and extending towards the aperture; and a circular float valve slidable along the lower portion of the funnel, the circular float valve covering the aperture when a fluid level in the container is less than a bottom section of the aperture.

2. The device of claim 1, wherein the circular float valve is proximate the lower portion of the funnel when the fluid level in the container is greater than the upper portion of the funnel.

3. The device of claim 2, wherein the aperture is proximate a lower sloped end of the sloped board.

4. The device of claim 3, further comprising an air chamber defined by the container and the funnel.

* * * * *